(12) United States Patent
Liu et al.

(10) Patent No.: US 11,895,045 B2
(45) Date of Patent: Feb. 6, 2024

(54) TRANSMISSION METHOD AND APPARATUS

(71) Applicant: HUAWEI TECHNOLOGIES CO., LTD., Shenzhen (CN)

(72) Inventors: Zhe Liu, Shenzhen (CN); Shulan Feng, Beijing (CN); Honglin Chai, Shanghai (CN); Xingwei Zhang, Lund (SE); Chao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 17/388,699

(22) Filed: Jul. 29, 2021

(65) Prior Publication Data

US 2021/0359802 A1 Nov. 18, 2021

Related U.S. Application Data

(63) Continuation of application No. PCT/CN2020/073574, filed on Jan. 21, 2020.

(30) Foreign Application Priority Data

Jan. 31, 2019 (CN) .......................... 201910101433.9

(51) Int. Cl.
H04L 5/00 (2006.01)
H04W 72/044 (2023.01)
(Continued)

(52) U.S. Cl.
CPC .......... *H04L 5/0032* (2013.01); *H04L 5/0051* (2013.01); *H04W 72/044* (2013.01); *H04W 72/56* (2023.01); *H04W 74/0833* (2013.01)

(58) Field of Classification Search
None
See application file for complete search history.

(56) References Cited

U.S. PATENT DOCUMENTS 8,014,342 B2 * 9/2011 Ekstedt ................. H04W 48/16
370/328
8,923,858 B2 * 12/2014 Perets ................... H04W 60/00
455/434

(Continued)

FOREIGN PATENT DOCUMENTS

| CN | 106717077 A | 5/2017 |
| CN | 110831140 A | 2/2020 |

(Continued)

OTHER PUBLICATIONS

R1-1801808, Huawei et al, Remaining details for uplink power control with CA, 3GPP TSG RAN WG1 Meeting #92, Athens, Greece, Feb. 26-Mar. 2, 2018, total 6 pages.

(Continued)

Primary Examiner — Faiyazkhan Ghafoerkhan
(74) Attorney, Agent, or Firm — HAUPTMAN HAM, LLP

(57) ABSTRACT

This application provides a transmission method and apparatus. The transmission method in this application includes: determining a to-be-processed channel, where the to-be-processed channel is a first channel or a second channel, the first channel is transmitted on a first carrier, the second channel is transmitted on a second carrier, the first channel and the second channel have different transmission start time points or transmission end time points, and the first channel (Continued)

and the second channel each have an overlapping transmission part in time domain; and skipping sending the overlapping transmission part of the to-be-processed channel.

20 Claims, 6 Drawing Sheets

(51) Int. Cl.
*H04W 74/08* (2009.01)
*H04W 72/56* (2023.01)

(56) References Cited

U.S. PATENT DOCUMENTS

| | | | |
|---|---|---|---|
| 9,717,084 B2* | 7/2017 | Nishikawa | H04L 5/001 |
| 11,228,990 B2* | 1/2022 | Jeon | H04W 52/50 |
| 11,558,855 B2* | 1/2023 | Dinan | H04L 5/0053 |
| 11,582,704 B2* | 2/2023 | Dinan | H04L 1/1812 |
| 11,611,988 B2* | 3/2023 | Yu | H04W 74/008 |
| 11,622,372 B2* | 4/2023 | Dinan | H04W 4/70 370/329 |
| 11,627,501 B2* | 4/2023 | Nguyen | H04B 17/318 370/329 |
| 2013/0217386 A1* | 8/2013 | Perets | H04W 60/00 455/434 |
| 2014/0293947 A1* | 10/2014 | Nishikawa | H04W 72/535 370/329 |
| 2017/0347271 A1* | 11/2017 | Baldemair | H04W 72/04 |
| 2020/0052843 A1* | 2/2020 | Cheng | H04W 72/20 |
| 2020/0053743 A1* | 2/2020 | Cheng | H04W 4/40 |
| 2020/0351801 A1* | 11/2020 | Jeon | H04W 52/48 |
| 2021/0051672 A1* | 2/2021 | Rastegardoost | H04W 74/006 |
| 2021/0359802 A1* | 11/2021 | Liu | H04W 74/0833 |

FOREIGN PATENT DOCUMENTS

| | | |
|---|---|---|
| EP | 3637912 A1 | 4/2020 |
| WO | 2018226065 A1 | 12/2018 |
| WO | 2019017746 A1 | 1/2019 |

OTHER PUBLICATIONS

3GPP TS 36.213 V15.4.0 (Dec. 2018), 3rd Generation Partnership Project; Technical Specification Group Radio Access Network;Evolved Universal Terrestrial Radio Access (E-UTRA); Physical layer procedures(Release 15), total 551 pages.
3GPP TS 38.101-1 V15.4.0 (Dec. 2018), 3rd Generation Partnership Project; Technical Specification Group Radio Access Network; NR;User Equipment (UE) radio transmission and reception;Part 1: Range 1 Standalone(Release 15), total 230 pages.
3GPP TS 38.101-3 V15.4.0 (Dec. 2018), 3rd Generation Partnership Project; Technical Specification Group Radio Access Network; NR;User Equipment (UE) radio transmission and reception;Part 3: Range 1 and Range 2 Interworking operation with other radios(Release 15), total 216 pages.
3GPP TS 38.213 V15.4.0 (Dec. 2018), 3rd Generation Partnership Project; Technical Specification Group Radio Access Network; NR;Physical layer procedures for control(Release 15), total 104 pages.
Extended European Search Report issued in corresponding European Application No. 20748983.2, dated Mar. 4, 2022, pp. 1-10.
ZTE et al., "Backhaul Link Packet Aggregated Transmission", TSG-RAN WG1 #58, R1-093202,Shenzhen, CN, Aug. 24-Aug. 28, 2009, R1-093202, total:5pages.

* cited by examiner

TRANSMISSION METHOD AND APPARATUS

CROSS-REFERENCE TO RELATED APPLICATIONS

This application is a continuation of International Application No. PCT/CN2020/073574, filed on Jan. 21, 2020, which claims priority to Chinese Patent Application No. 201910101433.9, filed on Jan. 31, 2019. The disclosures of the aforementioned applications are hereby incorporated by reference in their entireties.

TECHNICAL FIELD

This application relates to communications technologies, and in particular, to a transmission method and apparatus.

BACKGROUND

Descriptions of power control, performed during carrier aggregation (Carrier Aggregation, CA), defined in the 5G standard (New-RAT, NR) 38.213 protocol may be summarized as follows: If a sum of a power of a channel 1 transmitted on a carrier 1 and a power of a channel 2 transmitted on a carrier 2 exceeds a maximum transmit power of a terminal device, power reduction is performed based on a channel priority. Descriptions of power control, for long term evolution (Long Term Evolution, LTE)-NR dual connectivity (including intraband E-UTRA-NR dual connectivity (E-UTRA NR dual connectivity with MCG using E-UTRA and SCG using NR, EN-DC) and interband EN-DC), defined in the 38.213 protocol may be summarized as follows: If the terminal device is configured with a master cell group (Master Cell Group, MCG) using LTE radio access, and with a secondary cell group (Second Cell Group, SCG) using NR radio access, for transmission of the MCG, the terminal device configures a maximum power $P_{LTE}$ by using a higher-layer parameter p-MaxEUTRA; and for transmission of the SCG, the terminal device configures a maximum power $P_{NR}$ by using a higher-layer parameter p-NR. The terminal device uses $P_{LTE}$ (which is used as a maximum transmit power) as a constraint on a transmit power of an MCG, and uses $P_{NR}$ (which is used as a maximum transmit power) as a constraint on a transmit power of an SCG.

EN-DC dynamic power sharing means that: When $P_{LTE} + P_{NR} > \hat{P}_{Total}^{EN-DC}$, if the terminal device reports that E-UTRA-NR dynamic power sharing can be performed, and $\hat{P}_{MCG}(i_1) + \hat{P}_{SCG}(i_2) > \hat{P}_{Total}^{ENDC}$, where $\hat{P}_{MCG}(i_1)$ is the transmit power of the MCG and $\hat{P}_{SCG}(i_2)$ is the transmit power of the SCG, a power is limited by reducing $\hat{P}_{SCG}(i_2)$, to ensure that a sum of $\hat{P}_{MCG}(i_1)$ and $\hat{P}_{SCG}(i_2)$ does not exceed $\hat{P}_{Total}^{EN-DC}$.

However, a problem exists for intraband CA and the intraband EN-DC: When the terminal device performs CA, there is only one power amplifier (Power Amplifier, PA). For example, as shown in FIG. 1, the channels transmitted on the carrier 1 and the carrier 2 are not aligned in time domain and each have an overlapping transmission part. Therefore, transmission powers on the carrier 1 and the carrier 2 are divided into three parts. The problem cannot be resolved when there is only one PA, because power adjustment performed by the PA requires a transient period for power change, where the transient period is usually 10 microseconds.

A current solution is to report a capability of the terminal device to indicate whether the terminal device supports a capability of processing misaligned overlapping transmission. However, this does not substantially resolve a problem of how to resolve misaligned overlapping transmission.

SUMMARY

This application provides a transmission method and apparatus, to avoid frequent power change and resolve a power control problem in transmission.

According to a first aspect, this application provides a transmission method, including: determining a to-be-processed channel, where the to-be-processed channel is a first channel or a second channel, the first channel is transmitted on a first carrier, the second channel is transmitted on a second carrier, the first channel and the second channel have different transmission start time points or transmission end time points, and the first channel and the second channel each have an overlapping transmission part in time domain; and skipping sending the overlapping transmission part of the to-be-processed channel.

In this application, a part that is of a channel and that is in overlapping transmission with another channel is not sent, to avoid frequent power change and resolve a power control problem in overlapping transmission.

In a possible implementation, the method further includes: skipping sending a conversion part of the to-be-processed channel, where the conversion part is a part that corresponds to predefined duration and that is of the to-be-processed channel, and the conversion part and the overlapping transmission part are adjacent in time domain.

In a possible implementation, the determining a to-be-processed channel includes: determining, as the to-be-processed channel, a channel transmitted on a carrier with a smaller subcarrier spacing SCS or whose bandwidth part BWP has a smaller SCS in the first carrier and the second carrier.

In a possible implementation, the determining a to-be-processed channel further includes: if SCSs of BWPs of the first carrier and the second carrier are equal or SCSs of the first carrier and the second carrier are equal, determining, based on the transmission start time point of the first channel and the transmission start time point of the second channel, a channel whose transmission start time point is later as the to-be-processed channel; or determining, based on the transmission end time point of the first channel and the transmission end time point of the second channel, a channel whose transmission end time point is later as the to-be-processed channel.

In a possible implementation, the determining a to-be-processed channel further includes: if SCSs of BWPs of the first carrier and the second carrier are equal or SCSs of the first carrier and the second carrier are equal, determining, as the to-be-processed channel, a channel with a lower channel priority in the first channel and the second channel.

In a possible implementation, the determining a to-be-processed channel includes: determining, as the to-be-processed channel, a channel with a lower channel priority in the first channel and the second channel.

In a possible implementation, the determining a to-be-processed channel further includes: if channel priorities of the first channel and the second channel are equal, determining, based on the transmission start time point of the first channel and the transmission start time point of the second channel, a channel whose transmission start time point is later as the to-be-processed channel; or determining, based on the transmission end time point of the first channel and the transmission end time point of the second channel, a channel whose transmission end time point is later as the to-be-processed channel.

In a possible implementation, the determining a to-be-processed channel includes: determining, as the to-be-processed channel, a channel with longer transmission duration in the first channel and the second channel, where the transmission duration includes a quantity of symbols occupied by the channel in time domain.

In a possible implementation, the determining a to-be-processed channel includes: when the overlapping transmission part of the first channel or the overlapping transmission part of the second channel includes a demodulation reference signal DMRS, determining, as the to-be-processed channel, a channel that is of the first channel and the second channel and that does not include the DMRS; or when the overlapping transmission part of the first channel and the overlapping transmission part of the second channel each include the DMRS, determining a channel including a DMRS with a lower priority as the to-be-processed channel.

In a possible implementation, a priority of an additional DMRS is lower; or a priority of the DMRS of a channel with longer transmission duration is lower, where the transmission duration includes a quantity of symbols occupied by the channel in time domain; or a priority of the DMRS of a channel transmitted on a carrier with a smaller SCS or whose BWP has a smaller SCS in the first carrier and the second carrier is lower.

In a possible implementation, the determining a to-be-processed channel further includes: if priorities of the DMRSs included in the overlapping transmission part of the first channel and the overlapping transmission part of the second channel are equal, determining, based on the transmission start time point of the first channel and the transmission start time point of the second channel, a channel whose transmission start time point is later as the to-be-processed channel; or determining, based on the transmission end time point of the first channel and the transmission end time point of the second channel, a channel whose transmission end time point is later as the to-be-processed channel.

In a possible implementation, the method further includes: skipping sending the to-be-processed channel if a quantity of symbols of the overlapping transmission part is greater than a first preset threshold or a code rate of the overlapping transmission part is greater than a second preset threshold, where the first preset threshold and the second preset threshold are related to a modulation order and/or a code rate.

In a possible implementation, the method further includes: skipping sending the to-be-processed channel if a sum of a quantity of symbols of the overlapping transmission part and a quantity of symbols of the conversion part is greater than a first preset threshold or a code rate of the overlapping transmission part and a code rate of the conversion part are greater than a second preset threshold, where the first preset threshold and the second preset threshold are related to a modulation order and/or a code rate.

In this application, when a quantity of symbols occupied by an unsent part of the to-be-processed channel is relatively large, the channel may fail to be normally demodulated. In this case, a terminal device may directly not send the entire channel, to avoid a resource waste resulted from a case in which the channel fails to be demodulated after being transmitted.

According to a second aspect, this application provides an overlapping transmission method, including: when overlapping transmission parts of a third channel and a fourth channel in time domain each include a demodulation reference signal DMRS, and a spacing between the DMRS of the third channel and the DMRS of the fourth channel in time domain is greater than predefined duration, determining both the third channel and the fourth channel as to-be-processed channels, where the third channel and the fourth channel have different transmission start time points or transmission end time points; and skipping sending the overlapping transmission parts of the to-be-processed channels.

In this application, parts of both the two channels are not sent. A part that is of the third channel and that is in overlapping transmission with the DMRS of the fourth channel is not sent, and a part that is of the fourth channel and that is in overlapping transmission with the DMRS of the third channel is not sent, to avoid frequent power change and resolve a power control problem in overlapping transmission.

In a possible implementation, the skipping sending the overlapping transmission parts of the to-be-processed channels includes: abandoning transmission of a first part of the third channel, where the first part is the part that is in overlapping transmission with the DMRS of the fourth channel in time domain; abandoning transmission of a second part of the fourth channel, where the second part is the part that is in overlapping transmission with the DMRS of the third channel in time domain; and abandoning transmission of a third part, where the third part is the conversion part of the third channel or the fourth channel.

According to a third aspect, this application provides a transmission method, including: determining a to-be-processed channel, where the to-be-processed channel is a fifth channel or a sixth channel, a transmission link of the to-be-processed channel uses an NR access technology, a transmission link of a channel, of the fifth channel and the sixth channel, other than the to-be-processed channel uses an LTE access technology, the fifth channel and the sixth channel have different transmission start time points or transmission end time points, and the fifth channel and the sixth channel each have an overlapping transmission part in time domain; and skipping sending the overlapping transmission part of the to-be-processed channel.

In this application, to avoid affecting the transmission link using the LTE access technology, if the two channels have the overlapping transmission part, the overlapping transmission part of the channel on the transmission link that uses the NR access technology is not sent, to avoid frequent power change and resolve a power control problem in overlapping transmission.

In a possible implementation, the method further includes: skipping sending a conversion part of the to-be-processed channel, where the conversion part is a part that corresponds to predefined duration and that is of the to-be-processed channel, and the conversion part and the overlapping transmission part are adjacent in time domain.

In a possible implementation, the method further includes: skipping sending the to-be-processed channel if a quantity of symbols of the overlapping transmission part is greater than a first preset threshold or a code rate of the overlapping transmission part is greater than a second preset threshold, where the first preset threshold and the second preset threshold are related to a modulation order and/or a code rate.

In a possible implementation, the method further includes: skipping sending the to-be-processed channel if a sum of a quantity of symbols of the overlapping transmission part and a quantity of symbols of the conversion part is greater than a first preset threshold or a code rate of the overlapping transmission part and a code rate of the conversion part are greater than a second preset threshold, where the first preset threshold and the second preset threshold are related to a modulation order and/or a code rate.

In this application, when a quantity of symbols occupied by an unsent part of the to-be-processed channel is relatively large, the channel may fail to be normally demodulated. In this case, a terminal device may directly not send the entire channel, to avoid a resource waste resulted from a case in which the channel fails to be demodulated after being transmitted.

In a possible implementation, the to-be-processed channel is a random access channel, and the method further includes: when it is determined that the random access channel needs to be sent again, sending the random access channel again at a power used to send the random access channel last time; or when it is determined that the random access channel needs to be sent again, sending the random access channel again at a sum of a power used to send the random access channel last time and a preset power increment.

According to a fourth aspect, this application provides a power control method, including: performing power reduction on a random access channel, where a transmission link of the random access channel uses an NR access technology; sending the random access channel; and when it is determined that the random access channel needs to be sent again, sending the random access channel again at a power used to send the random access channel last time, or sending the random access channel again at a sum of a power used to send the random access channel last time and a preset power increment.

According to a fifth aspect, this application provides a transmission apparatus, including:

a first determining module, configured to determine a to-be-processed channel, where the to-be-processed channel is a first channel or a second channel, the first channel is transmitted on a first carrier, the second channel is transmitted on a second carrier, the first channel and the second channel have different transmission start time points or transmission end time points, and the first channel and the second channel each have an overlapping transmission part in time domain; and a first processing module, configured to skip sending the overlapping transmission part of the to-be-processed channel.

In a possible implementation, the first processing module is further configured to skip sending a conversion part of the to-be-processed channel, where the conversion part is a part that corresponds to predefined duration and that is of the to-be-processed channel, and the conversion part and the overlapping transmission part are adjacent in time domain.

In a possible implementation, the first determining module is specifically configured to determine, as the to-be-processed channel, a channel transmitted on a carrier with a smaller subcarrier spacing SCS or whose bandwidth part BWP has a smaller SCS in the first carrier and the second carrier.

In a possible implementation, the first determining module is further configured to: if SCSs of BWPs of the first carrier and the second carrier are equal or SCSs of the first carrier and the second carrier are equal, determine, based on the transmission start time point of the first channel and the transmission start time point of the second channel, a channel whose transmission start time point is later as the to-be-processed channel; or determine, based on the transmission end time point of the first channel and the transmission end time point of the second channel, a channel whose transmission end time point is later as the to-be-processed channel.

In a possible implementation, the first determining module is further configured to: if SCSs of BWPs of the first carrier and the second carrier are equal or SCSs of the first carrier and the second carrier are equal, determine, as the to-be-processed channel, a channel with a lower channel priority in the first channel and the second channel.

In a possible implementation, the first determining module is specifically configured to determine, as the to-be-processed channel, a channel with a lower channel priority in the first channel and the second channel.

In a possible implementation, the first determining module is further configured to: if channel priorities of the first channel and the second channel are equal, determine, based on the transmission start time point of the first channel and the transmission start time point of the second channel, a channel whose transmission start time point is later as the to-be-processed channel; or determine, based on the transmission end time point of the first channel and the transmission end time point of the second channel, a channel whose transmission end time point is later as the to-be-processed channel.

In a possible implementation, the first determining module is specifically configured to determine, as the to-be-processed channel, a channel with longer transmission duration in the first channel and the second channel, where the transmission duration includes a quantity of symbols occupied by the channel in time domain.

In a possible implementation, the first determining module is specifically configured to: when the overlapping transmission part of the first channel or the overlapping transmission part of the second channel includes a demodulation reference signal DMRS, determine, as the to-be-processed channel, a channel that is of the first channel and the second channel and that does not include the DMRS; or when the overlapping transmission part of the first channel and the overlapping transmission part of the second channel each include the DMRS, determine a channel including a DMRS with a lower priority as the to-be-processed channel.

In a possible implementation, a priority of an additional DMRS is lower; or a priority of the DMRS of a channel with longer transmission duration is lower, where the transmission duration includes a quantity of symbols occupied by the channel in time domain; or a priority of the DMRS of a channel transmitted on a carrier with a smaller SCS or whose BWP has a smaller SCS in the first carrier and the second carrier is lower.

In a possible implementation, the first determining module is further configured to: if priorities of the DMRSs included in the overlapping transmission part of the first channel and the overlapping transmission part of the second channel are equal, determine, based on the transmission start time point of the first channel and the transmission start time point of the second channel, a channel whose transmission start time point is later as the to-be-processed channel; or determine, based on the transmission end time point of the first channel and the transmission end time point of the second channel, a channel whose transmission end time point is later as the to-be-processed channel.

In a possible implementation, the first processing module is further configured to skip sending the to-be-processed channel if a quantity of symbols of the overlapping transmission part is greater than a first preset threshold or a code rate of the overlapping transmission part is greater than a second preset threshold, where the first preset threshold and the second preset threshold are related to a modulation order and/or a code rate.

In a possible implementation, the first processing module is further configured to skip sending the to-be-processed channel if a sum of a quantity of symbols of the overlapping transmission part and a quantity of symbols of the conversion part is greater than a first preset threshold or a code rate of the overlapping transmission part and a code rate of the conversion part are greater than a second preset threshold, where the first preset threshold and the second preset threshold are related to a modulation order and/or a code rate.

According to a sixth aspect, this application provides an overlapping transmission apparatus, including:

a second determining module, configured to: when overlapping transmission parts of a third channel and a fourth channel in time domain each include a demodulation reference signal DMRS, and a spacing between the DMRS of the third channel and the DMRS of the fourth channel in time domain is greater than predefined duration, determine both the third channel and the fourth channel as to-be-processed channels, where the third channel and the fourth channel have different transmission start time points or transmission end time points; and a second processing module, configured to skip sending the overlapping transmission parts of the to-be-processed channels.

In a possible implementation, the second processing module is specifically configured to: abandon transmission of a first part of the third channel, where the first part is a part that is in overlapping transmission with the DMRS of the fourth channel in time domain; abandon transmission of a second part of the fourth channel, where the second part is a part that is in overlapping transmission with the DMRS of the third channel in time domain; and abandon transmission of a third part, where the third part is the conversion part of the third channel or the fourth channel.

According to a seventh aspect, this application provides a transmission apparatus, including:

a third determining module, configured to determine a to-be-processed channel, where the to-be-processed channel is a fifth channel or a sixth channel, a transmission link of the to-be-processed channel uses an NR access technology, a transmission link of a channel, of the fifth channel and the sixth channel, other than the to-be-processed channel uses an LTE access technology, the fifth channel and the sixth channel have different transmission start time points or transmission end time points, and the fifth channel and the sixth channel each have an overlapping transmission part in time domain; and a third processing module, configured to skip sending the overlapping transmission part of the to-be-processed channel.

In a possible implementation, the third processing module is further configured to skip sending a conversion part of the to-be-processed channel, where the conversion part is a part that corresponds to predefined duration and that is of the to-be-processed channel, and the conversion part and the overlapping transmission part are adjacent in time domain.

In a possible implementation, the third processing module is further configured to skip sending the to-be-processed channel if a quantity of symbols of the overlapping transmission part is greater than a first preset threshold or a code rate of the overlapping transmission part is greater than a second preset threshold, where the first preset threshold and the second preset threshold are related to a modulation order and/or a code rate.

In a possible implementation, the third processing module is further configured to skip sending the to-be-processed channel if a sum of a quantity of symbols of the overlapping transmission part and a quantity of symbols of the conversion part is greater than a first preset threshold or a code rate of the overlapping transmission part and a code rate of the conversion part are greater than a second preset threshold, where the first preset threshold and the second preset threshold are related to a modulation order and/or a code rate.

In a possible implementation, the to-be-processed channel is a random access channel, and the third processing module is further configured to: when it is determined that the random access channel needs to be sent again, send the random access channel again at a power used to send the random access channel last time; or when it is determined that the random access channel needs to be sent again, send the random access channel again at a sum of a power used to send the random access channel last time and a preset power increment.

According to an eighth aspect, this application provides a power control apparatus, including:

a reduction module, configured to perform power reduction on a random access channel, where a transmission link of the random access channel uses an NR access technology; a sending module, configured to send the random access channel; and a processing module, configured to: when it is determined that the random access channel needs to be sent again, send the random access channel again at a power used to send the random access channel last time, or send the random access channel again at a sum of a power used to send the random access channel last time and a preset power increment.

According to a ninth aspect, this application provides user equipment, where the user equipment includes:
   one or more processors; and
   a memory, configured to store one or more programs, where
     when the one or more programs are executed by the one or more processors, the one or more processors are enabled to implement the method according to any one of the first aspect to the fourth aspect.

According to a tenth aspect, this application provides a computer-readable storage medium. The computer-readable storage medium stores instructions; and when the instructions are run on a computer, the instructions are used to perform the method according to any one of the first aspect to the fourth aspect.

According to an eleventh aspect, this application provides a computer program. When the computer program is executed by a computer, the computer program is used to perform the method according to any one of the first aspect to the fourth aspect.

DESCRIPTION OF EMBODIMENTS

To make objectives, technical solutions, and advantages of this application clearer, the following clearly and describes the technical solutions in this application with reference to the accompanying drawings in this application. Clearly, the described embodiments are merely a part rather than all of the embodiments of this application. All other embodiments obtained by a person of ordinary skill in the art based on the embodiments of this application without creative efforts shall fall within the protection scope of this application.

Figure 1:
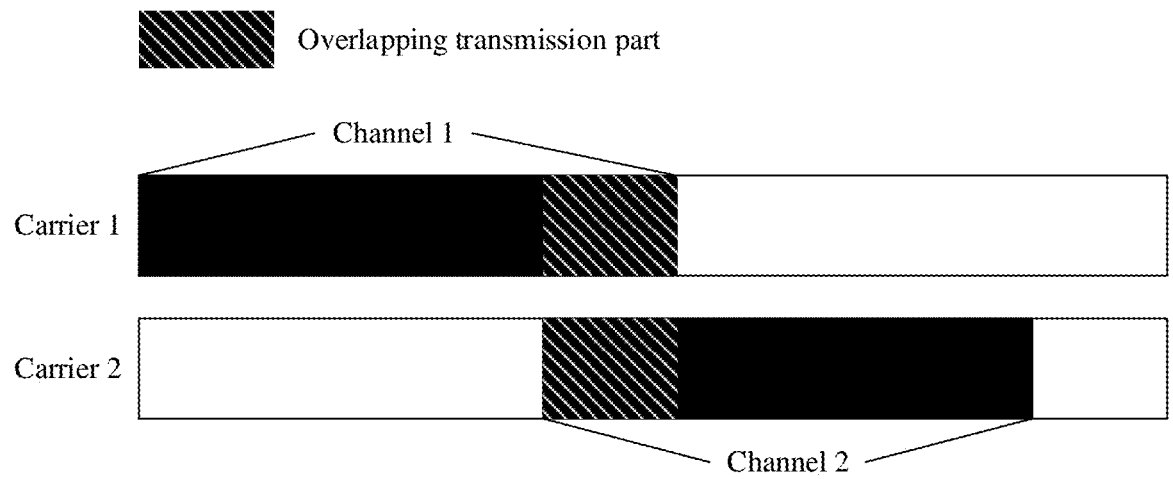
FIG. 1 is a schematic diagram of channel transmission in a current technology.
Figure 2:
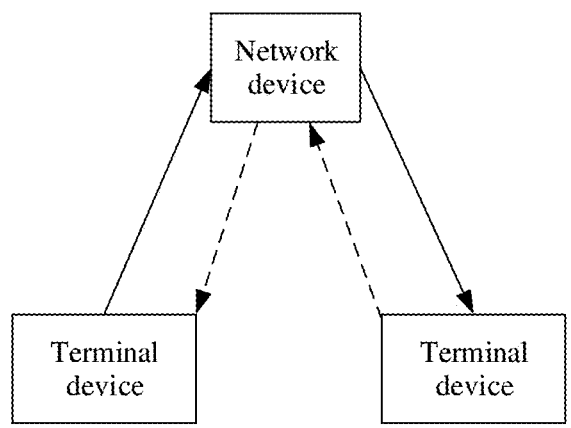
FIG. 2 is a schematic diagram of a communications system applicable to this application.

FIG. 2 is a schematic diagram of a communications system applicable to this application. As shown in FIG. 2, a plurality of terminal devices may access a same network device, the network device sends downlink information to the terminal device for communication, and the terminal device sends uplink information to the network device for communication. The network device and the terminal device may communicate with each other by using an LTE access technology or an NR access technology.

Figure 3:
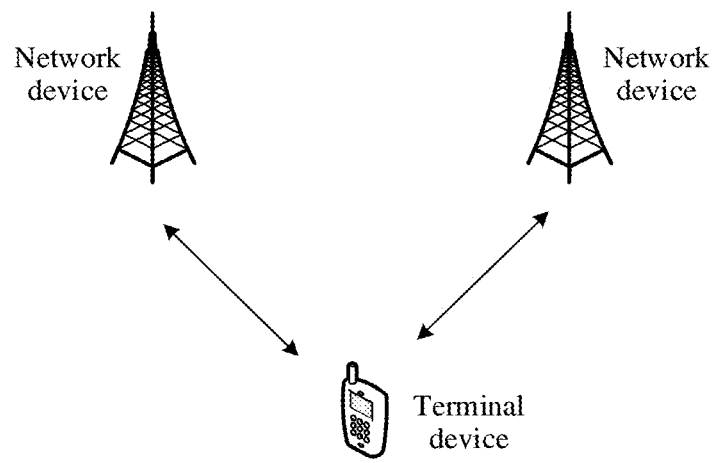
FIG. 3 is a schematic diagram of another communications system applicable to this application.

In an implementation, one terminal device may access the network device separately through two channels by using two access technologies. For example, one terminal device may access the network device separately by using the LTE access technology and the NR access technology. FIG. 3 is a schematic diagram of another communications system applicable to this application. As shown in FIG. 3, the communications system may include at least two network devices, such as two network devices shown in FIG. 3. The communications system may further include at least one terminal device, such as a terminal device shown in FIG. 3. The terminal device may separately establish a radio link with the two network devices by using a DC technology or a multi-connectivity technology. One network device may be, for example, a master base station, and the other network device may be, for example, a secondary base station. In this case, the master base station network device is a network device initially accessed by the terminal device, and is responsible for radio resource control (radio resource control, RRC) communication with the terminal device. The secondary base station network device may be added during RRC reconfiguration, and is configured to provide an additional radio resource.

In addition, for ease of understanding only, the figure shows a case in which two network devices are connected to the terminal device in a wireless manner. However, this should not constitute any limitation on a scenario to which this application is applicable. The terminal device may further establish a radio link with more network devices.

Each communications device, such as the network device and the terminal device in FIG. 3, may be configured with a plurality of antennas. The plurality of antennas may include at least one transmit antenna used to send a signal and at least one receive antenna used to receive a signal. In addition, each communications device additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multiple-antenna technology.

The technical solutions of the embodiments of this application may be applied to various communications systems, such as: a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service system, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunications system, UMTS), a worldwide interoperability for microwave access (worldwide interoperability for microwave access, WiMAX) communications system, and a 5th generation (5th generation, 5G) system or a new radio (new radio, NR) system.

As an example rather than a limitation, in the embodiments of this application, the terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a future evolved public land mobile network (public land mobile network, PLMN), or the like. This is not limited in the embodiments of this application.

As an example rather than a limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not only a hardware device, but is configured to implement a powerful function through software support, data exchange, and cloud interaction. In a broad sense, wearable intelligent devices include full-featured and large-size devices that can implement complete or partial functions without depending on smartphones, for example, smartwatches or smart glasses, and devices that focus on only one type of application function and need to work with other devices such as smartphones, for example, various smart bands or smart jewelry for monitoring physical signs.

In addition, the terminal device in the embodiments of this application may alternatively be a terminal device in an internet of things (internet of things, IoT) system. The IoT is an important part of future development of information technologies, and a main technical feature of the IoT is to connect a thing to a network by using a communications technology, to implement an intelligent network for interconnection between a person and a machine or between one thing and another.

The network device in the embodiments of this application may be a device configured to communicate with the terminal device. The network device may be a base transceiver station (base transceiver station, BTS) in a global system for mobile communications (global system for mobile communications, GSM) system or a code division multiple access (code division multiple access, CDMA) system, or may be a NodeB (NodeB, NB) in a wideband code division multiple access (wideband code division multiple access, WCDMA) system, or may be an evolved NodeB (evolved NodeB, eNB or eNodeB) in an LTE system, or may be a radio controller in a scenario of a cloud radio access network (cloud radio access network, CRAN). Alternatively, the network device may be a relay station, an access point, a vehicle-mounted device, a wearable device, a network device in a future 5G network, a network device in a future evolved PLMN network, or the like, or may be an access point (access point, AP) in a WLAN, or may be a gNB in a new radio (new radio, NR) system. This is not limited in the embodiments of this application.

In addition, in the embodiments of this application, an access network device serves a cell. The terminal device communicates with the access network device on a transmission resource (for example, a frequency domain resource, namely, a spectrum resource) used for the cell. The cell may be a cell corresponding to the access network device (for example, a base station). The cell may belong to a macro base station, or a base station corresponding to a small cell (small cell). The small cell herein may include a metro cell (metro cell), a micro cell (micro cell), a pico cell (pico cell), a femto cell (femto cell), or the like. These small cells have features of small coverage and low transmit power, and are applicable to providing a high-rate data transmission service.

In addition, in the LTE system or the 5G system, a plurality of cells may simultaneously work on a carrier in a same frequency band. In some special scenarios, it may be considered that a concept of the carrier is equivalent to a concept of a cell. For example, in a carrier aggregation (carrier aggregation, CA) scenario, when a secondary carrier is configured for the terminal device, both a carrier index of the secondary carrier and a cell identity (cell identification, Cell ID) of a secondary cell working on the secondary carrier are carried. In this case, it may be considered that the concept of the carrier is equivalent to the concept of the cell. For example, access of the terminal device to a carrier is equivalent to access of the terminal device to a cell.

A core network device may be connected to a plurality of access network devices, and configured to control the access network devices; and can distribute, to the access network devices, data received from a network side (for example, the internet).

In addition, in this application, the network device may include a gNB (gNB), for example, a macro base station, a micro base station, an indoor hotspot, and a relay node, and has functions of: sending a radio wave to the terminal device, to implement downlink data transmission on one hand and control uplink transmission by sending scheduling information on the other hand; and receiving a radio wave sent by the terminal device, to receive uplink data transmission.

The foregoing listed functions and specific implementations of the terminal device, the access network device, and the core network device are merely examples for description, and this application is not limited thereto.

In the embodiments of this application, the terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). The operating system may be any one or more of computer operating systems implementing service processing through a process (process), for example, a Linux operating system, a UNIX operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication based on the method provided in the embodiments of this application. For example, the method provided in the embodiments of this application may be performed by the terminal device, the network device, or a functional module that is in the terminal device or the network device and that can invoke and execute the program.

Figure 4:
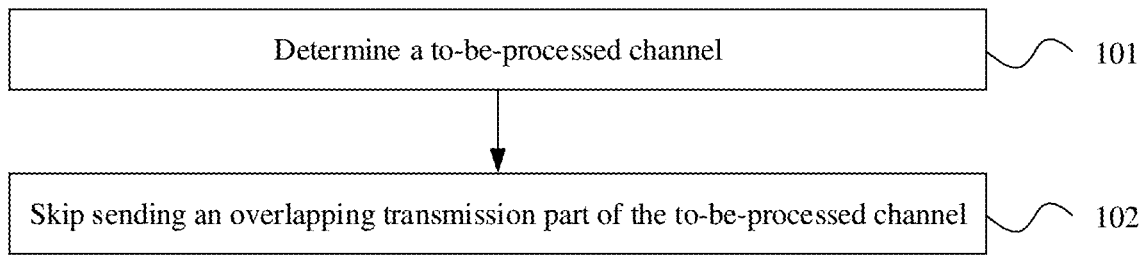
FIG. 4 is a flowchart of Embodiment 1 of a transmission method according to this application.

FIG. 4 is a flowchart of Embodiment 1 of a transmission method according to this application. As shown in FIG. 4, this embodiment may be performed by a terminal device, and the method may include the following steps.

Step 101: Determine a to-be-Processed Channel.

The to-be-processed channel is a first channel or a second channel, the first channel is transmitted on a first carrier, and the second channel is transmitted on a second carrier. Channel transmission occupies a time-frequency resource on a carrier or in a bandwidth part (bandwidth part, BWP). The time-frequency resource is a time domain resource and a frequency domain resource. For example, a physical uplink shared channel (physical uplink shared channel, PUSCH) and a physical uplink control channel (physical uplink control channel, PUCCH) occupy the time-frequency resource for transmission. The first channel and the second channel have different transmission start time points or transmission end time points, and the first channel and the second channel each have an overlapping transmission part in time domain. In this embodiment, it is necessary to determine, from the first channel and the second channel, which channel is the to-be-processed channel, and the following several methods may be included.

1. A channel transmitted on a carrier with a smaller subcarrier spacing (subcarrier spacing, SCS) or whose BWP has a smaller SCS in the first carrier and the second carrier is determined as the to-be-processed channel. If SCSs of BWPs of the first carrier and the second carrier are equal or SCSs of the first carrier and the second carrier are equal, a channel with a lower channel priority in the first channel and the second channel is determined as the to-be-processed channel. If channel priorities of the first channel and the second channel are equal, a channel whose transmission start time point is later is determined as the to-be-processed channel based on the transmission start time point of the first channel and the transmission start time point of the second channel; or a channel whose transmission end time point is later is determined as the to-be-processed channel based on the transmission end time point of the first channel and the transmission end time point of the second channel.

According to the method, the SCSs of the BWPs of the first carrier and the second carrier or the SCSs of the first carrier and the second carrier are used as a main determining condition, and the channel transmitted on the carrier with the smaller SCS or whose BWP has the smaller SCS is the to-be-processed channel. If the to-be-processed channel cannot be determined based on the main determining condition, the channel priorities are used as a secondary determining condition, that is, the channel with the lower channel priority is the to-be-processed channel. The channel priority may be determined based on information transmitted on the channel carried on the carrier. For example, the first channel is a physical uplink shared channel (physical uplink shared channel, PUSCH), and the PUSCH carries only data (data). The second channel is also a PUSCH, information carried on the PUSCH includes an uplink control information (uplink control information, UCI), and the UCI may include channel state information (channel state information, CSI), a hybrid automatic repeat request (Hybrid automatic repeat request, HARQ), a scheduling request (Scheduling request, SR), and the like. Transmission of the UCI needs to take precedence over transmission of the data. Therefore, the priority of the second channel is higher than that of the first channel. It should be noted that there is further another implementation example of determining the channel priority. This is not limited. If the to-be-processed channel cannot be determined based on the secondary determining condition, transmission time points of the channels are used as a third determining condition, that is, the channel whose transmission start time point is later or whose transmission end time point is later is the to-be-processed channel.

2. A channel transmitted on a carrier with a smaller SCS or whose BWP has a smaller SCS in the first carrier and the second carrier is determined as the to-be-processed channel. If SCSs of BWPs of the first carrier and the second carrier are equal or SCSs of the first carrier and the second carrier are equal, a channel whose transmission start time point is later is determined as the to-be-processed channel based on the transmission start time point of the first channel and the transmission start time point of the second channel; or a channel whose transmission end time point is later is determined as the to-be-processed channel based on the transmission end time point of the first channel and the transmission end time point of the second channel.

According to the method, the SCSs of the BWPs of the first carrier and the second carrier or the SCSs of the first carrier and the second carrier are used as a main determining condition, and the channel transmitted on the carrier with the smaller SCS or whose BWP has the smaller SCS is the to-be-processed channel. If the to-be-processed channel cannot be determined based on the main determining condition, transmission time points of the channels are used as a secondary determining condition, that is, the channel whose transmission start time point is later or whose transmission end time point is later is the to-be-processed channel.

3. A channel with a lower channel priority in the first channel and the second channel is determined as the to-be-processed channel. If channel priorities of the first channel and the second channel are equal, a channel whose transmission start time point is later is determined as the to-be-processed channel based on the transmission start time point of the first channel and the transmission start time point of the second channel; or a channel whose transmission end time point is later is determined as the to-be-processed channel based on the transmission end time point of the first channel and the transmission end time point of the second channel.

According to the method, the channel priorities are used as a main determining condition without considering SCSs of BWPs or SCSs of the carriers, that is, the channel with the lower channel priority is the to-be-processed channel. If the to-be-processed channel cannot be determined based on the main determining condition, transmission time points of the channels are used as a secondary determining condition, that is, the channel whose transmission start time point is later or whose transmission end time point is later is the to-be-processed channel.

4. A channel with longer transmission duration in the first channel and the second channel is determined as the to-be-processed channel, where the transmission duration includes a quantity of symbols occupied by the channel in time domain, or transmission of the channel is at a slot level or at a mini-slot (mini-slot) level. For example, in NR, channel transmission of a PUSCH may occupy different quantities of symbols, or a priority of slot-level channel transmission is lower than that of mini-slot level channel transmission.

According to the method, the transmission duration is used as a determining condition. The transmission duration includes the quantity of symbols occupied by the channel in time domain, and a channel, of the first channel and the second channel, that occupies a larger quantity of symbols is the to-be-processed channel. For example, transmission of the first channel is mini-slot transmission, and transmission of the second channel is common-slot transmission. A quantity of symbols occupied by a mini-slot is less than a quantity of symbols occupied by a common slot. Therefore, the second channel is the to-be-processed channel.

5. If scheduling information of a channel, of the first channel and the second channel, whose transmission start time point is later is not successfully demodulated before a channel whose transmission start time point is earlier is sent, the channel whose transmission start time point is later is determined as the to-be-processed channel.

According to the method, the transmission start time points of the two channels are used as a determining condition. Considering time points at which the terminal device obtains scheduling information of the first channel and the second channel, if the channel whose transmission start time point is earlier starts to be transmitted before the terminal device obtains the scheduling information of the channel whose transmission start time point is later, the terminal device may directly use the channel whose transmission start time point is later as the to-be-processed channel without considering other factors, including channel priorities, sizes of SCSs of BWPs, sizes of SCSs of the carriers, and the like. For example, a transmission start time point of the first channel is earlier than a transmission start time point of the second channel. When the transmission start time point of the first channel arrives before the terminal device receives the scheduling information of the second channel or obtains the scheduling information through demodulation, the terminal device directly determines the second channel as the to-be-processed channel.

6. Whether the overlapping transmission part of the first channel and/or the overlapping transmission part of the second channel include/includes a demodulation reference signal (Demodulation Reference Signal, DMRS) is determined. If the overlapping transmission part of the first channel or the overlapping transmission part of the second channel each includes the DMRS, a channel that is of the first channel and the second channel and that does not include the DMRS is determined as the to-be-processed channel; or if the overlapping transmission part of the first channel and the overlapping transmission part of the second channel each include the DMRS, a channel including a DMRS with a lower priority is determined as the to-be-processed channel. If priorities of the DMRSs included in the overlapping transmission part of the first channel and the overlapping transmission part of the second channel are equal, a channel whose transmission start time point is later is determined as the to-be-processed channel based on the transmission start time point of the first channel and the transmission start time point of the second channel; or a channel whose transmission end time point is later is determined as the to-be-processed channel based on the transmission end time point of the first channel and the transmission end time point of the second channel.

A difference of the method from the foregoing two methods lies in that the DMRS is used as a main determining condition. If the overlapping transmission part of one of the first channel and the second channel includes the DMRS, the other channel that does not include the DMRS is the to-be-processed channel. In other words, to ensure demodulation of a PUSCH and a PUCCH, it needs to be ensured that the DMRS is transmitted. Therefore, the channel that does not include the DMRS needs to be processed. If both the overlapping transmission parts of the first channel and the second channel include the DMRSs, the channel including the DMRS with the lower priority may be the to-be-processed channel based on the priorities of the included DMRSs. For example, the first channel includes a front loaded DMRS (front loaded DMRS), and the second channel includes an additional DMRS (additional DMRS). A priority of the additional DMRS is lower than that of the front loaded DMRS. Therefore, the second channel is the to-be-processed channel. For another example, transmission of the first channel is mini-slot transmission, and transmission of the second channel is common-slot transmission. Therefore, the second channel is the to-be-processed channel. For still another example, an SCS of a BWP of the first carrier on which the first channel is located is less than an SCS of a BWP of the second carrier on which the second channel is located. Therefore, the first channel is the to-be-processed channel. If the to-be-processed channel cannot be determined based on the main determining condition when both the two channels include the DMRSs, transmission time points of the channels are used as a secondary determining condition, that is, a channel whose transmission start time point is later or whose transmission end time point is later is the to-be-processed channel.

Step 102: Skip Sending the Overlapping Transmission Part of the to-be-Processed Channel.

After determining the to-be-processed channel, the terminal device resolves a power control problem in overlapping transmission by skipping sending the overlapping transmission part of the to-be-processed channel. To be specific, the terminal device sends only a to-be-unprocessed channel on a symbol or in a slot or a subframe corresponding to the overlapping transmission part, to avoid frequent power change. Step 102 may also be equivalent to sending a part of the to-be-processed channel other than the overlapping transmission part.

The terminal device may further skip sending a conversion part of the to-be-processed channel, where the conversion part is a part that corresponds to predefined duration and that is of the to-be-processed channel, and the conversion part and the overlapping transmission part are adjacent in time domain. Similarly, it may be considered that the terminal device sends a part of the to-be-processed channel other than the overlapping transmission part and the conversion part. The predefined duration may be duration required when the terminal device performs power change, and the predefined duration may be in a unit of a symbol. For example, power change usually requires change duration of 10 microseconds. The terminal device may not send a part that corresponds to the 10 microseconds and that is before or after the overlapping transmission part of the to-be-processed channel, so that there is sufficient time to change from a power for transmitting the to-be-unprocessed channel to a power for transmitting the to-be-processed channel. Alternatively, the terminal device may not send, based on the SCS of the BWP or the SCS of the carrier, m symbols corresponding to the 10 microseconds, where m is a positive integer. For example, for a subcarrier spacing of 15 kHz, the 10 microseconds correspond to one symbol.

In this embodiment, a part that is of a channel and that is in overlapping transmission with another channel is not sent, to avoid frequent power change and resolve the power control problem in overlapping transmission.

Based on the foregoing technical solutions, the terminal device may determine whether a quantity of symbols of the overlapping transmission part is greater than a first preset threshold or whether a code rate of the overlapping transmission part is greater than a second preset threshold. If the quantity of symbols of the overlapping transmission part is greater than the first preset threshold or the code rate of the overlapping transmission part is greater than the second preset threshold, the to-be-processed channel is not sent. The first preset threshold and the second preset threshold may be indicated by using higher layer signaling, for example, RRC signaling, a MAC CE, or a SIB; or may be predefined by a network device and then configured for the terminal device; or may be predefined values, or predefined values obtained through searching a table. Both the first preset threshold and the second preset threshold are related to a modulation order and/or a code rate. For example, in one possibility, if the modulation order and/or the code rate are/is higher, the first preset threshold and the second preset threshold are smaller. If the modulation order or the code rate is very high, transmission of the channel on each symbol carries a large quantity of significant bits. If the overlapping transmission part and/or the conversion part are/is not sent, that is, a part of an effective transmission part is not sent, the channel fails to be demodulated. When a quantity of symbols occupied by an unsent part of the to-be-processed channel is relatively large, the channel may fail to be normally demodulated. In this case, the terminal device may directly not send the entire channel, to avoid a resource waste resulted from a case in which the channel fails to be demodulated after being transmitted. In addition, if the terminal device does not send the overlapping transmission part and the conversion part, the terminal device needs to perform determining based on both the overlapping transmission part and the conversion part. To be specific, if a sum of the quantity of symbols of the overlapping transmission part and a quantity of symbols of the conversion part is greater than the first preset threshold or a code rate of the overlapping transmission part and a code rate of the conversion part are greater than the second preset threshold, the to-be-processed channel is not sent.

Figure 5:
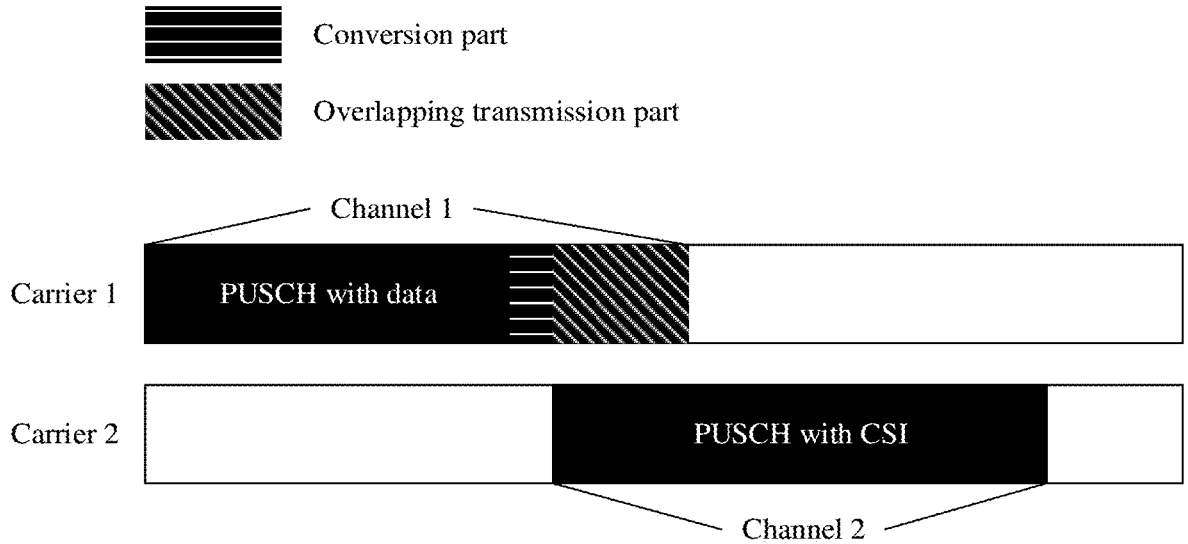
FIG. 5 is a schematic diagram of channel transmission of Embodiment 1 of a transmission method according to this application.
Figure 6:
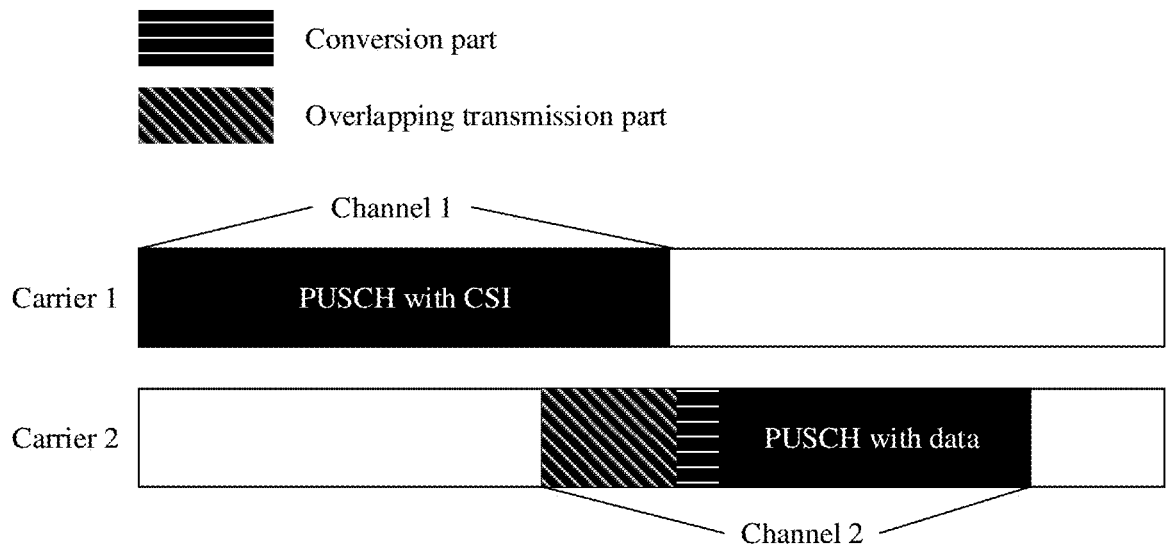
FIG. 6 is another schematic diagram of channel transmission of Embodiment 1 of a transmission method according to this application.

For example, as shown in FIG. 5, a channel 1 is transmitted on a carrier 1, a channel 2 is transmitted on a carrier 2, and the carrier 1 and the carrier 2 are two carriers in a same band. A transmission start time point of the channel 1 is earlier than a transmission start time point of the channel 2. The channel 1 is a PUSCH with data, and the channel 2 is a PUSCH with CSI. Therefore, the channel 2 has a higher priority than the channel 1, and the channel 1 is the to-be-processed channel. In this case, the terminal device skips sending an overlapping transmission part and a conversion part of the channel 1. Considering a transmission sequence of the channel 1 and the channel 2, transmission of the conversion part is before that of the overlapping transmission part. As shown in FIG. 6, a channel 1 is transmitted on a carrier 1, a channel 2 is transmitted on a carrier 2, and the carrier 1 and the carrier 2 are two carriers in a same band. A transmission start time point of the channel 1 is earlier than a transmission start time point of the channel 2. The channel 1 is a PUSCH with CSI, and the channel 2 is a PUSCH with data. Therefore, the channel 1 has a higher priority than the channel 2, and the channel 2 is the to-be-processed channel. In this case, the terminal device skips sending an overlapping transmission part and a conversion part of the channel 2. Considering a transmission sequence of the channel 1 and the channel 2, transmission of the conversion part is after that of the overlapping transmission part.

Figure 7:
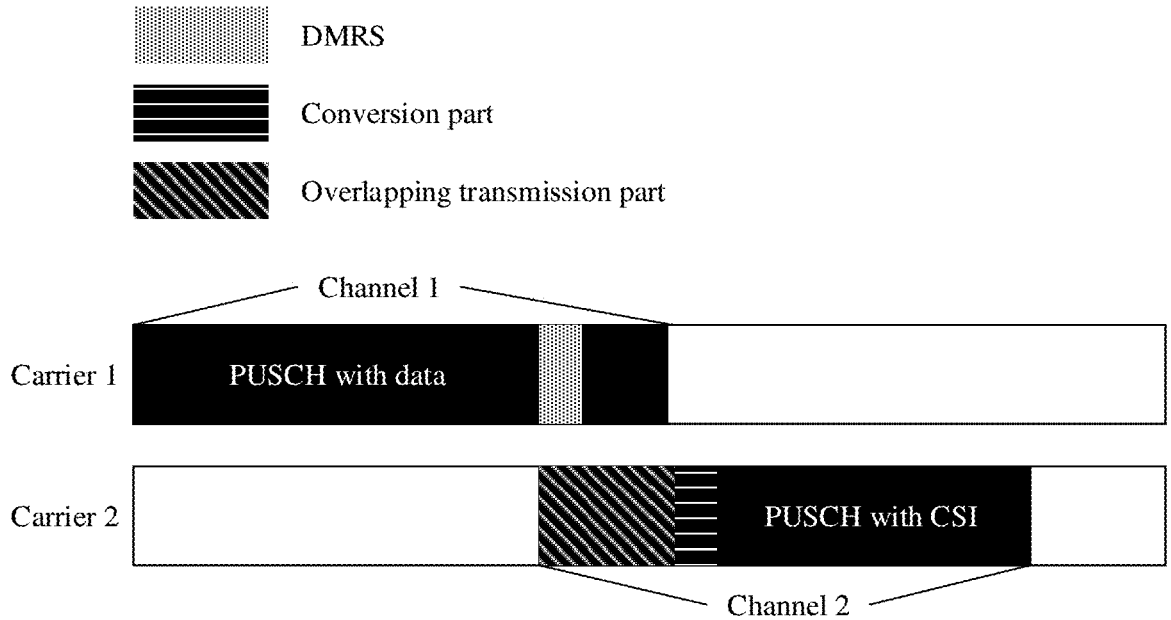
FIG. 7 is still another schematic diagram of channel transmission of Embodiment 1 of a transmission method according to this application.
Figure 8:
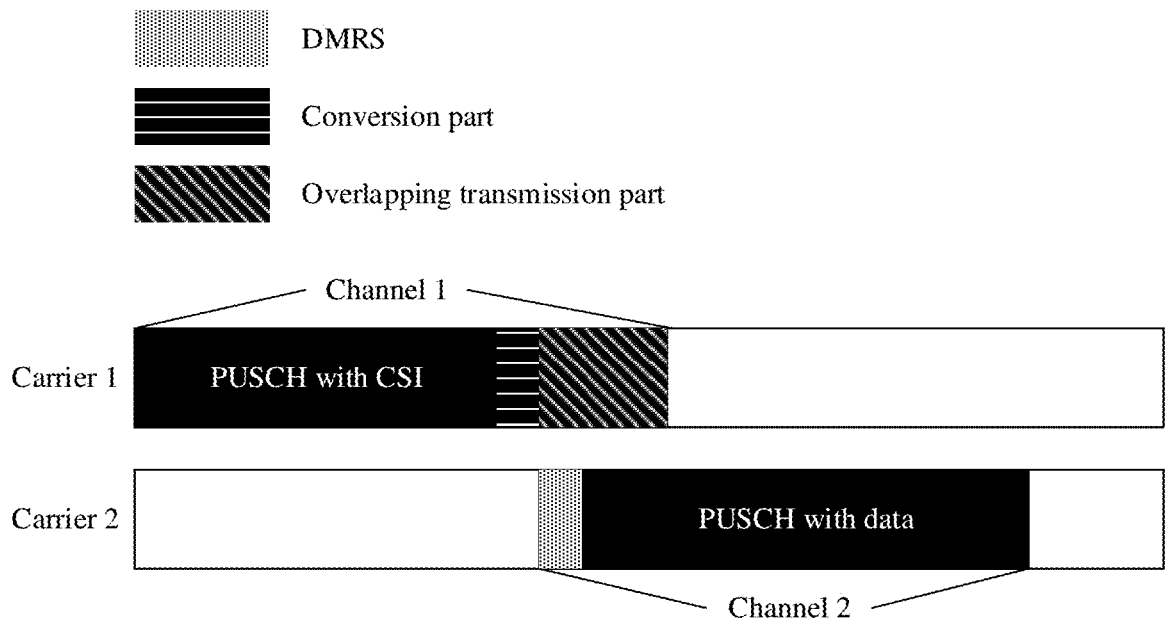
FIG. 8 is yet another schematic diagram of channel transmission of Embodiment 1 of a transmission method according to this application.

For example, as shown in FIG. 7, a channel 1 is transmitted on a carrier 1, a channel 2 is transmitted on a carrier 2, and the carrier 1 and the carrier 2 are two carriers in a same band. A transmission start time point of the channel 1 is earlier than a transmission start time point of the channel 2. The channel 1 is a PUSCH with data, and the channel 2 is a PUSCH with CSI. However, because an overlapping transmission part of the channel 1 includes a DMRS, the channel 2 is the to-be-processed channel. In this case, the terminal device skips sending an overlapping transmission part and a conversion part of the channel 2. Considering a transmission sequence of the channel 1 and the channel 2, transmission of the conversion part is after that of the overlapping transmission part. As shown in FIG. 8, a channel 1 is transmitted on a carrier 1, a channel 2 is transmitted on a carrier 2, and the carrier 1 and the carrier 2 are two carriers in a same band. A transmission start time point of the channel 1 is earlier than a transmission start time point of the channel 2. The channel 1 is a PUSCH with CSI, and the channel 2 is a PUSCH with data. However, because an overlapping transmission part of the channel 2 includes a DMRS, the channel 1 is the to-be-processed channel. In this case, the terminal device skips sending an overlapping transmission part and a conversion part of the channel 1. Considering a transmission sequence of the channel 1 and the channel 2, transmission of the conversion part is before that of the overlapping transmission part.

A difference from Method Embodiment 1 lies in: In Method Embodiment 2 of this application, when overlapping transmission parts of a third channel and a fourth channel each include a DMRS, and if a spacing between the DMRS of the third channel and the DMRS of the fourth channel in time domain is greater than predefined duration, a terminal device determines both the third channel and the fourth channel as to-be-processed channels, that is, abandons transmission of a first part of the third channel, where the first part is a part that is in overlapping transmission with the DMRS of the fourth channel in time domain; abandons transmission of a second part of the fourth channel, where the second part is a part that is in overlapping transmission with the DMRS of the third channel in time domain; and abandons transmission of a third part, where the third part is a conversion part of the third channel or the fourth channel. The predefined duration may be duration corresponding to the conversion part.

In this embodiment, parts of both the two channels are not sent. The part that is of the third channel and that is in overlapping transmission with the DMRS of the fourth channel is not sent, and the part that is of the fourth channel and that is in overlapping transmission with the DMRS of the third channel is not sent. In addition, the terminal device may further skip sending a part that is of the third channel or the fourth channel and that corresponds to duration required for power change, so that there is sufficient time to change from a power for transmitting a to-be-unprocessed channel to a power for transmitting the to-be-processed channel.

Figure 9:
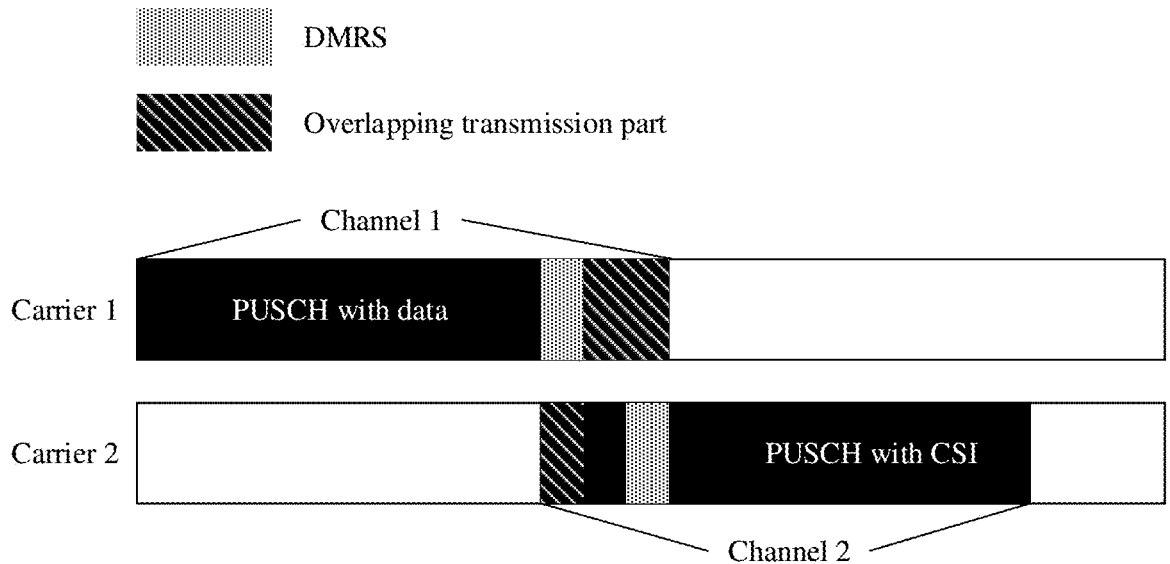
FIG. 9 is a schematic diagram of channel transmission of Embodiment 2 of a transmission method according to this application.

For example, as shown in FIG. 9, a channel 3 is transmitted on a carrier 3, a channel 4 is transmitted on a carrier 4, and the carrier 3 and the carrier 4 are two carriers in a same band. A transmission start time point of the channel 3 is earlier than a transmission start time point of the channel 4. The channel 3 is a PUSCH with data, and the channel 4 is a PUSCH with CSI. Overlapping transmission parts of the channel 3 and the channel 4 each include a DMRS, and a spacing between the DMRS of the channel 3 and the DMRS of the channel 4 in time domain is greater than predefined duration. In this case, the terminal device skips sending the overlapping transmission parts of the channel 3 and the channel 4, and skips sending a conversion part of one of the channels. In this case, whether the conversion part of the channel 3 or the channel 4 is not sent may depend on priorities of the two channels, a transmission sequence of the two channels, and the like. This is not limited.

In Method Embodiment 3 of this application, in an intraband EN-DC scenario, a terminal device determines a to-be-processed channel, where the to-be-processed channel is a fifth channel or a sixth channel, a transmission link of the to-be-processed channel uses an NR access technology, a transmission link of a channel, of the fifth channel and the sixth channel, other than the to-be-processed channel uses an LTE access technology, the fifth channel and the sixth channel have different transmission start time points or transmission end time points, and the fifth channel and the sixth channel each have an overlapping transmission part in time domain; and skips sending the overlapping transmission part of the to-be-processed channel. Further, the terminal device may even not send a conversion part of the to-be-processed channel.

In this embodiment, to avoid affecting the transmission link using the LTE access technology, once the two channels have the overlapping transmission parts, the overlapping transmission part of the channel on the transmission link that uses the NR access technology is not sent. This is irrelevant to a channel priority and a signal included on the channel. The to-be-processed channel is not sent if a quantity of symbols of the unsent overlapping transmission part of the to-be-processed channel is greater than a first preset threshold or a code rate of the overlapping transmission part is greater than a second preset threshold, where the first preset threshold and the second preset threshold are related to a modulation order and/or a code rate. When a quantity of symbols occupied by an unsent part of the to-be-processed channel is relatively large, the channel may fail to be normally demodulated. In this case, the terminal device may directly not send the entire channel, to avoid a resource waste resulted from a case in which the channel fails to be demodulated after being transmitted. In addition, if the terminal device does not send the overlapping transmission part and the conversion part, the terminal device needs to perform determining based on both the overlapping transmission part and the conversion part. To be specific, if a sum of the quantity of symbols of the overlapping transmission part and a quantity of symbols of the conversion part is greater than the first preset threshold or the code rate of the overlapping transmission part and a code rate of the conversion part are greater than the second preset threshold, the to-be-processed channel is not sent.

Based on the foregoing technical solution, in the intra-band EN-DC scenario, if the to-be-processed channel is a random access channel, and sending of the random access channel fails because the overlapping transmission part is not sent, that is, the terminal device determines that the random access channel needs to be sent again, the terminal device may send the random access channel again at a power used to send the random access channel last time, or send the random access channel again at a sum of a power used to send the random access channel last time and a preset power increment. In this embodiment, a value of the preset power increment is less than an existing general power increment. For example, a power is usually increased with a step of 3 dB during power ramping. In this embodiment, to avoid power waste during transmission of the random access channel and save power, the power is increased with a step of 1 dB.

In Method Embodiment 4 of this application, in an interband EN-DC scenario, to avoid affecting a transmission link using an LTE access technology, a terminal device performs power reduction on a random access channel whose transmission link uses an NR access technology, and then sends the random access channel. If the terminal device determines that the random access channel needs to be sent again, the terminal device sends the random access channel again at a power used to send the random access channel last time, or sends the random access channel again at a sum of a power used to send the random access channel last time and a preset power increment. In this embodiment, a value of the preset power increment is less than an existing general power increment. For example, a power is usually increased with a step of 3 dB during power ramping. In this embodiment, to avoid power waste during transmission of the random access channel and save power, the power is increased with a step of 1 dB.

Figure 10:
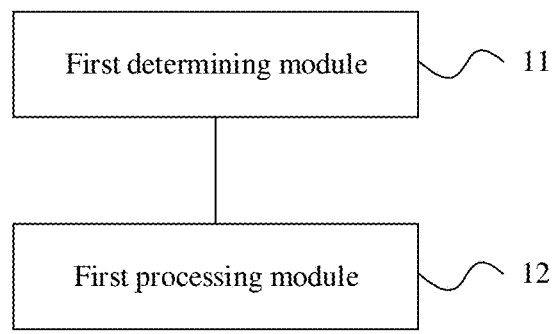
FIG. 10 is a schematic structural diagram of Embodiment 1 of a transmission apparatus according to this application.

FIG. 10 is a schematic structural diagram of Embodiment 1 of a transmission apparatus according to this application. As shown in FIG. 10, the apparatus in this embodiment may include a first determining module 11 and a first processing module 12. The first determining module 11 is configured to determine a to-be-processed channel, where the to-be-processed channel is a first channel or a second channel, the first channel is transmitted on a first carrier, the second channel is transmitted on a second carrier, the first channel and the second channel have different transmission start time points or transmission end time points, and the first channel and the second channel each have an overlapping transmission part in time domain. The first processing module 12 is configured to skip sending the overlapping transmission part of the to-be-processed channel.

In a possible implementation, the first processing module 12 is further configured to skip sending a conversion part of the to-be-processed channel, where the conversion part is a part that corresponds to predefined duration and that is of the to-be-processed channel, and the conversion part and the overlapping transmission part are adjacent in time domain.

In a possible implementation, the first determining module 11 is specifically configured to determine, as the to-be-processed channel, a channel transmitted on a carrier with a smaller subcarrier spacing SCS or whose bandwidth part BWP has a smaller SCS in the first carrier and the second carrier.

In a possible implementation, the first determining module 11 is further configured to: if SCSs of BWPs of the first carrier and the second carrier are equal or SCSs of the first carrier and the second carrier are equal, determine, based on the transmission start time point of the first channel and the transmission start time point of the second channel, a channel whose transmission start time point is later as the to-be-processed channel; or determine, based on the transmission end time point of the first channel and the transmission end time point of the second channel, a channel whose transmission end time point is later as the to-be-processed channel.

In a possible implementation, the first determining module 11 is further configured to: if SCSs of BWPs of the first carrier and the second carrier are equal or SCSs of the first carrier and the second carrier are equal, determine, as the to-be-processed channel, a channel with a lower channel priority in the first channel and the second channel.

In a possible implementation, the first determining module 11 is specifically configured to determine, as the to-be-processed channel, a channel with a lower channel priority in the first channel and the second channel.

In a possible implementation, the first determining module 11 is further configured to: if channel priorities of the first channel and the second channel are equal, determine, based on the transmission start time point of the first channel and the transmission start time point of the second channel, a channel whose transmission start time point is later as the to-be-processed channel; or determine, based on the transmission end time point of the first channel and the transmission end time point of the second channel, a channel whose transmission end time point is later as the to-be-processed channel.

In a possible implementation, the first determining module 11 is specifically configured to determine, as the to-be-processed channel, a channel with longer transmission duration in the first channel and the second channel, where the transmission duration includes a quantity of symbols occupied by the channel in time domain.

In a possible implementation, the first determining module 11 is specifically configured to: when the overlapping transmission part of the first channel or the overlapping transmission part of the second channel includes a demodulation reference signal DMRS, determine, as the to-be-processed channel, a channel that is of the first channel and the second channel and that does not include the DMRS; or when the overlapping transmission part of the first channel and the overlapping transmission part of the second channel each include the DMRS, determine a channel including a DMRS with a lower priority as the to-be-processed channel.

In a possible implementation, a priority of an additional DMRS is lower; or a priority of the DMRS of a channel with longer transmission duration is lower, where the transmission duration includes a quantity of symbols occupied by the channel in time domain; or a priority of the DMRS of a channel transmitted on a carrier with a smaller SCS or whose BWP has a smaller SCS in the first carrier and the second carrier is lower.

In a possible implementation, the first determining module 11 is further configured to: if priorities of the DMRSs included in the overlapping transmission part of the first channel and the overlapping transmission part of the second channel are equal, determine, based on the transmission start time point of the first channel and the transmission start time point of the second channel, a channel whose transmission start time point is later as the to-be-processed channel; or determine, based on the transmission end time point of the first channel and the transmission end time point of the second channel, a channel whose transmission end time point is later as the to-be-processed channel.

In a possible implementation, the first processing module 12 is further configured to skip sending the to-be-processed channel if a quantity of symbols of the overlapping transmission part is greater than a first preset threshold or a code rate of the overlapping transmission part is greater than a second preset threshold, where the first preset threshold and the second preset threshold are related to a modulation order and/or a code rate.

In a possible implementation, the first processing module 11 is further configured to skip sending the to-be-processed channel if a sum of a quantity of symbols of the overlapping transmission part and a quantity of symbols of the conversion part is greater than a first preset threshold or a code rate of the overlapping transmission part and a code rate of the conversion part are greater than a second preset threshold, where the first preset threshold and the second preset threshold are related to a modulation order and/or a code rate.

The apparatus in this embodiment may be used to perform the technical solutions of the method embodiments shown from FIG. 4 to FIG. 8. Implementation principles and technical effects of the apparatus are similar and are not described herein again.

Figure 11:
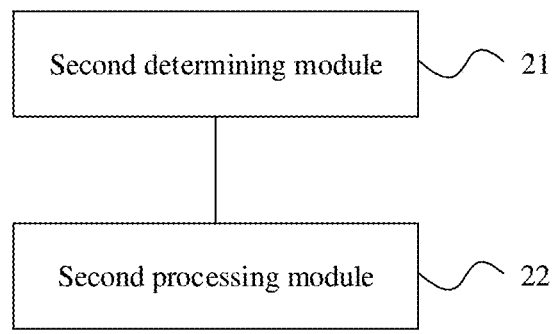
FIG. 11 is a schematic structural diagram of Embodiment 2 of a transmission apparatus according to this application.

FIG. 11 is a schematic structural diagram of Embodiment 2 of a transmission apparatus according to this application. As shown in FIG. 11, the apparatus in this embodiment may include a second determining module 21 and a second processing module 22. The second determining module 21 is configured to: when overlapping transmission parts of a third channel and a fourth channel in time domain each include a demodulation reference signal DMRS, and a spacing between the DMRS of the third channel and the DMRS of the fourth channel in time domain is greater than predefined duration, determine both the third channel and the fourth channel as to-be-processed channels, where the third channel and the fourth channel have different transmission start time points or transmission end time points. The second processing module 22 is configured to skip sending the overlapping transmission parts of the to-be-processed channels.

In a possible implementation, the second processing module 22 is specifically configured to: abandon transmission of a first part of the third channel, where the first part is a part that is in overlapping transmission with the DMRS of the fourth channel in time domain; abandon transmission of a second part of the fourth channel, where the second part is a part that is in overlapping transmission with the DMRS of the third channel in time domain; and abandon transmission of a third part, where the third part is the conversion part of the third channel or the fourth channel.

The apparatus in this embodiment may be used to perform the technical solutions of the method embodiment shown in FIG. 9. The implementation principles and technical effects of the apparatus are similar and are not described herein again.

Figure 12:
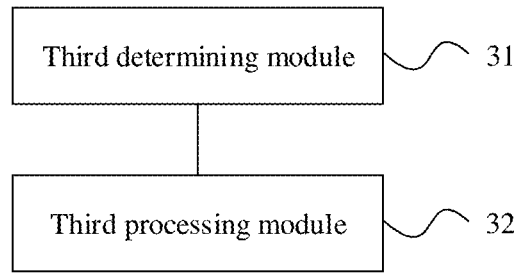
FIG. 12 is a schematic structural diagram of Embodiment 3 of a transmission apparatus according to this application.

FIG. 12 is a schematic structural diagram of Embodiment 3 of a transmission apparatus according to this application. As shown in FIG. 12, the apparatus in this embodiment may include a third determining module 31 and a third processing module 32. The third determining module 31 is configured to determine a to-be-processed channel, where the to-be-processed channel is a fifth channel or a sixth channel, a transmission link of the to-be-processed channel uses an NR access technology, a transmission link of a channel, of the fifth channel and the sixth channel, other than the to-be-processed channel uses an LTE access technology, the fifth channel and the sixth channel have different transmission start time points or transmission end time points, and the fifth channel and the sixth channel each have an overlapping transmission part in time domain. The third processing module 32 is configured to skip sending the overlapping transmission part of the to-be-processed channel.

In a possible implementation, the third processing module 32 is further configured to skip sending a conversion part of the to-be-processed channel, where the conversion part is a part that corresponds to predefined duration and that is of the to-be-processed channel, and the conversion part and the overlapping transmission part are adjacent in time domain.

In a possible implementation, the third processing module 32 is further configured to skip sending the to-be-processed channel if a quantity of symbols of the overlapping transmission part is greater than a first preset threshold or a code rate of the overlapping transmission part is greater than a second preset threshold, where the first preset threshold and the second preset threshold are related to a modulation order and/or a code rate.

In a possible implementation, the third processing module 32 is further configured to skip sending the to-be-processed channel if a sum of a quantity of symbols of the overlapping transmission part and a quantity of symbols of the conversion part is greater than a first preset threshold or a code rate of the overlapping transmission part and a code rate of the conversion part are greater than a second preset threshold, where the first preset threshold and the second preset threshold are related to a modulation order and/or a code rate.

In a possible implementation, the to-be-processed channel is a random access channel, and the third processing module 32 is further configured to: when it is determined that the random access channel needs to be sent again, send the random access channel again at a power used to send the random access channel last time; or when it is determined that the random access channel needs to be sent again, send the random access channel again at a sum of a power used to send the random access channel last time and a preset power increment.

Figure 13:
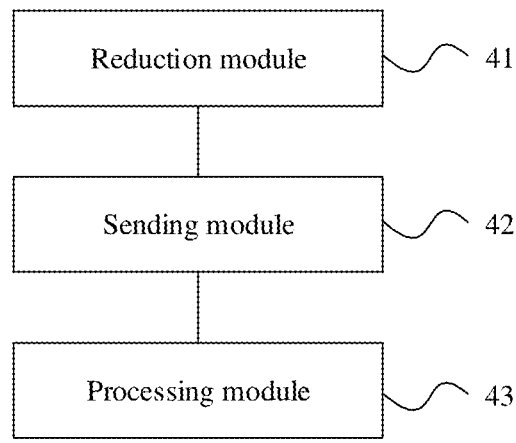
FIG. 13 is a schematic structural diagram of an embodiment of a power control apparatus according to this application.

FIG. 13 is a schematic structural diagram of an embodiment of a power control apparatus according to this application. As shown in FIG. 13, the apparatus in this embodiment may include a reduction module 41, a sending module 42, and a processing module 43. The reduction module 41 is configured to perform power reduction on a random access channel, where a transmission link of the random access channel uses an NR access technology. The sending module 42 is configured to send the random access channel. The processing module 43 is configured to: when it is determined that the random access channel needs to be sent again, send the random access channel again at a power used to send the random access channel last time, or send the random access channel again at a sum of a power used to send the random access channel last time and a preset power increment.

Figure 14:
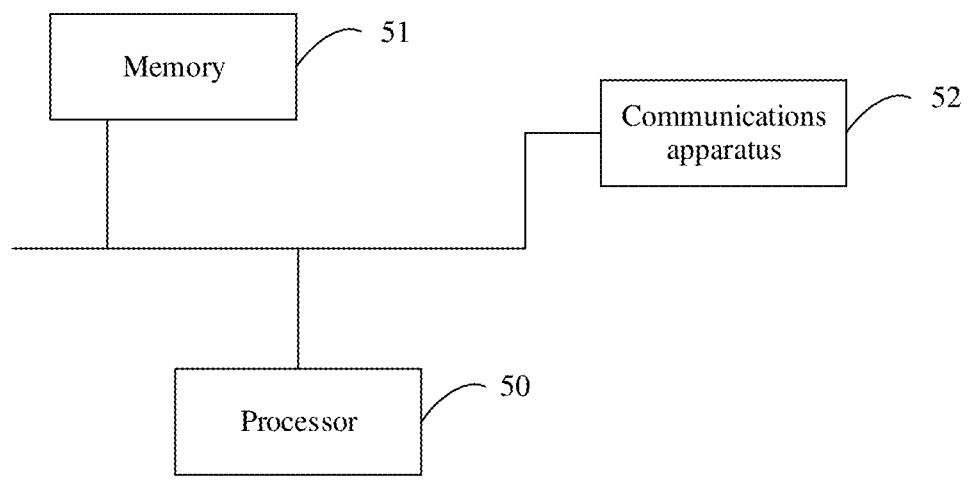
FIG. 14 is a schematic structural diagram of an embodiment of user equipment according to this application.

FIG. 14 is a schematic structural diagram of an embodiment of user equipment according to this application. As shown in FIG. 14, the user equipment includes a processor 50, a memory 51, and a communications apparatus 52. There may be one or more processors 50 in the user equipment. One processor 50 is used as an example in FIG. 14. The processor 50, the memory 51, and the communications apparatus 52 in the user equipment may be connected by using a bus or in another manner. In FIG. 14, connection by using a bus is used as an example.

As a computer-readable storage medium, the memory 51 may be configured to store a software program, a computer-executable program, and a module, for example, a program instruction/module corresponding to the method in any one of the embodiments shown in FIG. 4 to FIG. 9 in this application. By running the software program, the instruction, and the module that are stored in the memory 51, the processor 50 executes various function applications of the user equipment and performs data processing, that is, implements the foregoing transmission method.

The memory 51 may mainly include a program storage area and a data storage area. The program storage area may store an operating system and an application program required by at least one function. The data storage area may store data created based on use of a terminal, and the like. In addition, the memory 51 may include a high-speed random access memory, and may further include a non-volatile memory, for example, at least one magnetic disk storage device, a flash storage device, or another non-volatile solid-state storage device. In some examples, the memory 51 may further include a memory that is remotely disposed for the processor 50, and the remote memory may be connected to the user equipment through a network. Examples of the foregoing network include but are not limited to the internet, an intranet, a local area network, a mobile communications network, and a combination thereof.

The communications apparatus 52 may be configured to receive or send data.

In a possible implementation, this application provides a computer-readable storage medium. The computer-readable storage medium stores instructions; and when the instructions are run on a computer, the instructions are used to perform the method in any embodiment shown in FIG. 4 to FIG. 9.

In a possible implementation, this application provides a computer program. When the computer program is executed by a computer, the computer program is used to perform the method in any embodiment shown in FIG. 4 to FIG. 9.

A person of ordinary skill in the art may understand that all or some of the steps of the method embodiments may be implemented by a program instructing related hardware. The program may be stored in a computer-readable storage medium. When the program is executed, the steps in the foregoing method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A transmission method, comprising:
   determining a to-be-processed channel, wherein the to-be-processed channel is a first channel or a second channel, the first channel is transmitted on a first carrier, the second channel is transmitted on a second carrier, the first channel and the second channel have different transmission start time points or transmission end time points, the first channel and the second channel each have an overlapping transmission part in time domain, and the to-be-processed channel is determined based, at least in part, on a comparison between a first subcarrier spacing of the first channel and a second subcarrier spacing of the second channel; and
   skipping sending the overlapping transmission part of the to-be-processed channel; and
   skipping sending a conversion part of the to-be-processed channel, wherein the conversion part is a part that corresponds to predefined duration and that is part of the to-be-processed channel, and the conversion part and the overlapping transmission part are adjacent in time domain.

2. The method according to claim 1, wherein the determining the to-be-processed channel comprises:
   determining, as the to-be-processed channel, a channel with a lower channel priority in the first channel and the second channel.

3. The method according to claim 1, wherein the determining a to-be-processed channel further comprises:
   in response to determining channel priorities of the first channel and the second channel are equal, determining, based on the transmission start time point of the first channel and the transmission start time point of the second channel, a channel whose transmission start time point is later as the to-be-processed channel; or
   determining, based on the transmission end time point of the first channel and the transmission end time point of the second channel, a channel whose transmission end time point is later as the to-be-processed channel.

4. The method according to claim 1, wherein the determining the to-be-processed channel comprises:
   in response to determining the overlapping transmission part of the first channel or the overlapping transmission part of the second channel comprises a demodulation reference signal DMRS, determining, as the to-be-processed channel, a channel that is of the first channel and the second channel and that does not comprise the DMRS; or
   in response to determining the overlapping transmission part of the first channel and the overlapping transmission part of the second channel each comprises a DMRS, determining a channel comprising a DMRS with a lower priority as the to-be-processed channel.

5. The method according to claim 1, further comprising:
   skipping sending the to-be-processed channel in response to determining a quantity of symbols of the overlapping transmission part is greater than a first preset threshold or a code rate of the overlapping transmission part is greater than a second preset threshold, wherein the first preset threshold and the second preset threshold are related to a modulation order and/or a code rate.

6. The method according to claim 1, further comprising:

skipping sending the to-be-processed channel in response to determining a sum of a quantity of symbols of the overlapping transmission part and a quantity of symbols of the conversion part is greater than a first preset threshold or a code rate of the overlapping transmission part and a code rate of the conversion part are greater than a second preset threshold, wherein the first preset threshold and the second preset threshold are related to a modulation order and/or a code rate.

7. A transmission method, comprising:

determining a to-be-processed channel, wherein the to-be-processed channel is a fifth channel or a sixth channel, a transmission link of the to-be-processed channel uses an NR access technology, a transmission link of a channel, of the fifth channel and the sixth channel, other than the to-be-processed channel uses an LTE access technology, the fifth channel and the sixth channel have different transmission start time points or transmission end time points, and the fifth channel and the sixth channel each have an overlapping transmission part in time domain; and skipping sending the overlapping transmission part of the to-be-processed channel; and skipping sending a conversion part of the to-be-processed channel, wherein the conversion part is a part that corresponds to predefined duration and that is part of the to-be-processed channel, and the conversion part and the overlapping transmission part are adjacent in time domain.

8. The method according to claim 7, further comprising:

skipping sending the to-be-processed channel in response to determining a quantity of symbols of the overlapping transmission part is greater than a first preset threshold or a code rate of the overlapping transmission part is greater than a second preset threshold, wherein the first preset threshold and the second preset threshold are related to a modulation order and/or a code rate.

9. The method according to claim 7, further comprising:

skipping sending the to-be-processed channel in response to determining a sum of a quantity of symbols of the overlapping transmission part and a quantity of symbols of the conversion part is greater than a first preset threshold or a code rate of the overlapping transmission part and a code rate of the conversion part are greater than a second preset threshold, wherein the first preset threshold and the second preset threshold are related to a modulation order and/or a code rate.

10. The method according to claim 7, wherein the to-be-processed channel is a random access channel, and the method further comprises:

in response to determining that the random access channel needs to be sent again, sending the random access channel again at a power used to send the random access channel last time; or in response to determining that the random access channel needs to be sent again, sending the random access channel again at a sum of a power used to send the random access channel last time and a preset power increment.

11. A transmission apparatus, comprising:

a processor; and a memory having instructions stored thereon that, when executed by the processor, cause the transmission apparatus to:

determine a to-be-processed channel, wherein the to-be-processed channel is a first channel or a second channel, the first channel is transmitted on a first carrier, the second channel is transmitted on a second carrier, the first channel and the second channel have different transmission start time points or transmission end time points, the first channel and the second channel each have an overlapping transmission part in time domain, and the to-be-processed channel is determined based, at least in part, on a comparison between a first subcarrier spacing of the first channel and a second subcarrier spacing of the second channel; and skip sending the overlapping transmission part of the to-be-processed channel; and skip sending a conversion part of the to-be-processed channel, wherein the conversion part is a part that corresponds to predefined duration and that is part of the to-be-processed channel, and the conversion part and the overlapping transmission part are adjacent in time domain.

12. The transmission apparatus according to claim 11, wherein the transmission apparatus is further caused to:

determine, as the to-be-processed channel, a channel with a lower channel priority in the first channel and the second channel.

13. The transmission apparatus according to claim 11, wherein the transmission apparatus is further caused to:

in response to determining channel priorities of the first channel and the second channel are equal, determine, based on the transmission start time point of the first channel and the transmission start time point of the second channel, a channel whose transmission start time point is later as the to-be-processed channel; or determine, based on the transmission end time point of the first channel and the transmission end time point of the second channel, a channel whose transmission end time point is later as the to-be-processed channel.

14. The transmission apparatus according to claim 11, wherein the transmission apparatus is further caused to:

in response to determining the overlapping transmission part of the first channel or the overlapping transmission part of the second channel comprises a demodulation reference signal DMRS, determine, as the to-be-processed channel, a channel that is of the first channel and the second channel and that does not comprise the DMRS; or in response to determining the overlapping transmission part of the first channel and the overlapping transmission part of the second channel each comprise a DMRS, determine a channel comprising a DMRS with a lower priority as the to-be-processed channel.

15. The transmission apparatus according to claim 11, wherein the transmission apparatus is further caused to:

skip sending the to-be-processed channel in response to determining a quantity of symbols of the overlapping transmission part is greater than a first preset threshold or a code rate of the overlapping transmission part is greater than a second preset threshold, wherein the first preset threshold and the second preset threshold are related to a modulation order and/or a code rate.

16. The transmission apparatus according to claim 11, wherein the transmission apparatus is further caused to:
- skip sending the to-be-processed channel in response to determining a sum of a quantity of symbols of the overlapping transmission part and a quantity of symbols of the conversion part is greater than a first preset threshold or a code rate of the overlapping transmission part and a code rate of the conversion part are greater than a second preset threshold, wherein the first preset threshold and the second preset threshold are related to a modulation order and/or a code rate.

17. A transmission apparatus, comprising:
- a processor; and
- a memory having instructions stored thereon that, when executed by the processor, cause the transmission apparatus to:
- determine a to-be-processed channel, wherein the to-be-processed channel is a fifth channel or a sixth channel, a transmission link of the to-be-processed channel uses an NR access technology, a transmission link of a channel, of the fifth channel and the sixth channel, other than the to-be-processed channel uses an LTE access technology, the fifth channel and the sixth channel have different transmission start time points or transmission end time points, and the fifth channel and the sixth channel each have an overlapping transmission part in time domain; and
- skip sending the overlapping transmission part of the to-be-processed channel; and
- skip sending a conversion part of the to-be-processed channel, wherein the conversion part is a part that corresponds to predefined duration and that is part of the to-be-processed channel, and the conversion part and the overlapping transmission part are adjacent in time domain.

18. The transmission apparatus according to claim 17, wherein the transmission apparatus is further caused to:
- skip sending the to-be-processed channel in response to determining a quantity of symbols of the overlapping transmission part is greater than a first preset threshold or a code rate of the overlapping transmission part is greater than a second preset threshold, wherein the first preset threshold and the second preset threshold are related to a modulation order and/or a code rate.

19. The transmission apparatus according to claim 18, wherein the transmission apparatus is further caused to:
- skip sending the to-be-processed channel in response to determining a sum of a quantity of symbols of the overlapping transmission part and a quantity of symbols of the conversion part is greater than a first preset threshold or a code rate of the overlapping transmission part and a code rate of the conversion part are greater than a second preset threshold, wherein the first preset threshold and the second preset threshold are related to a modulation order and/or a code rate.

20. The transmission apparatus according to claim 17, wherein the to-be-processed channel is a random access channel, and the transmission apparatus is further caused to:
- in response to determining that the random access channel needs to be sent again, send the random access channel again at a power used to send the random access channel last time; or
- in response to determining that the random access channel needs to be sent again, send the random access channel again at a sum of a power used to send the random access channel last time and a preset power increment.

* * * * *